United States Patent
Hsu

(10) Patent No.: US 6,388,900 B1
(45) Date of Patent: May 14, 2002

(54) CONSTANT-FREQUENCY ACTIVE FILTER CONTROLLED BY A PEAK CURRENT CONTROL MODE

(75) Inventor: Hau-Jean Hsu, Tainan Hsien (TW)

(73) Assignee: Phoenixtec Power Co., Ltd., Taipei (TW)

( * ) Notice: Subject to any disclaimer, the term of this patent is extended or adjusted under 35 U.S.C. 154(b) by 0 days.

(21) Appl. No.: 09/754,333

(22) Filed: Jan. 5, 2001

(51) Int. Cl.$^7$ .............................................. H02M 3/335
(52) U.S. Cl. ...................................... 363/21.01; 363/20
(58) Field of Search ................................ 363/20, 21.01, 363/21.04, 21.05, 21.07, 21.1, 21.12, 21.13, 21.15, 21.18

(56) References Cited

U.S. PATENT DOCUMENTS

| | | | |
|---|---|---|---|
| 5,475,579 A | * | 12/1995 | John et al. ..................... 363/21 |
| 5,862,044 A | * | 1/1999 | Shioya et al. .................. 363/21 |
| 5,896,279 A | * | 4/1999 | Lin ............................... 363/21 |
| 6,088,244 A | * | 7/2000 | Shioya et al. .................. 363/21 |
| 6,125,046 A | * | 9/2000 | Jang et al. ..................... 363/49 |

\* cited by examiner

*Primary Examiner*—Matthew Nguyen
(74) *Attorney, Agent, or Firm*—Bacon & Thomas

(57) ABSTRACT

A constant-frequency active filter controlled by a peak current control mode, the constant-frequency active filter composes of a voltage step-up unit and a power factor corrector, wherein the power factor corrector is composed of a voltage control loop and a current control loop. The voltage step-up unit adjusts a waveform of an input current to a sine waveform. The voltage control loop has a microprocessor that provides a current command having the same phase with an input voltage to a PWM controller of the current control loop. The current control loop provides a sensing current induced from the input current to the PWM controller. The PWM controller receives the sensing current and the current command to control the input voltage and the input current to become the same phase so as to obtain a high power factor.

4 Claims, 2 Drawing Sheets

CONSTANT-FREQUENCY ACTIVE FILTER CONTROLLED BY A PEAK CURRENT CONTROL MODE

BACKGROUND OF THE INVENTION

1. Field of the Invention

The present invention relates to a constant-frequency active filter controlled by a peak current control mode, and more particularly to a constant-frequency active filter which has a voltage step-up unit and an active power factor corrector to adjust an input current and input voltage to the same phase so as to obtain a high power factor.

2. Description of Related Art

Power factor correcting techniques are generally separated into an active mode and a passive mode. The passive mode means that passive elements such as capacitors and inductors are used to improve a waveform and phase of an input current so as to achieve a purpose of power factor correcting. The active mode means that a power factor corrector is used to control an active switching element to be selectively activated and deactivated for adjusting the waveform of the input current to a sine waveform so as to obtain a high power factor.

An active filter often uses a voltage step-up unit between a bridge rectifier and a filtering capacitor. By controlling the active switching element in the voltage step-up unit, the sine waveform input current is obtained and hence the power factor is raised. The voltage step-up unit controlling techniques generally adopt a voltage-follower mode or an error-multiplier mode. However a switching frequency of the active switching element is not constant and has variation corresponding to different voltage levels of the voltage step-up unit, and hence it is difficult for the active filter to conform with a regulation of electronic-magnetic interference (EMI).

Furthermore, a conventional active power factor corrector is controlled by an analog mode, and a circuit structure of the active power factor corrector is complicated. Once resistance and capacitance values in the active power factor corrector are decided, the active power factor corrector can only operate in a specific condition. If the active power factor corrector is expected to operate in different conditions, the resistance and capacitance values need to be changed to match the different conditions. Thus, the power factor corrector is not suitable for immediately improving harmonic distortions and the power factor of the active filter.

To overcome the shortcomings, the present invention tends to provide a constant-frequency active filter controlled by peak current control mode to mitigate and obviate the aforementioned problems.

SUMMARY OF THE INVENTION

The main objective of the invention tends to provide a constant-frequency active filter controlled by a peak current control mode, and the constant-frequency active filter has an active power factor corrector that is composed of a voltage control unit and current control unit for raising a power factor.

Other objects, advantages and novel features of the invention will become more apparent from the following detailed description when taken in conjunction with the accompanying drawings.

DETAILED DESCRIPTION OF THE PREFERRED EMBODIMENT

Figure 1:
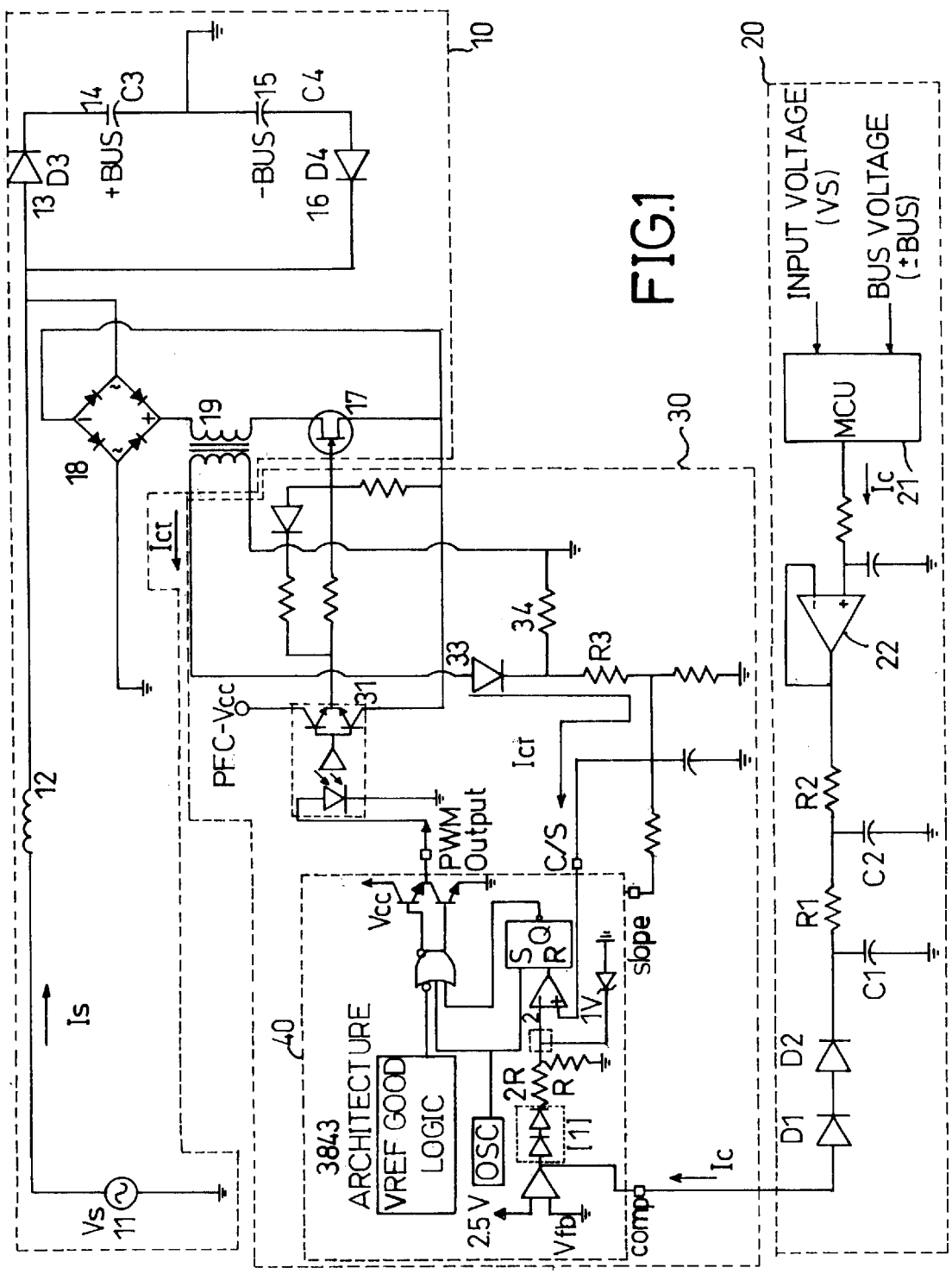
FIG. 1 is a circuit diagram showing that a constant-frequency active filter is controlled by a peak current control mode in accordance with the present invention.

With reference to FIG. 1, a constant-frequency active filter controlled with a peak current control mode includes a voltage step-up unit (10) and a power factor corrector. The power factor corrector is composed of a voltage control unit (20) and a current control unit (30), wherein the current control unit (30) includes a pulse width modulation (PWM) controller (40).

The voltage step-up unit (10) comprises a power supply (11) that provides an input voltage ($V_S$) and an input current ($I_S$), a voltage step-up inductor (12) connected to the power supply (11), an input of a bridge rectifier (18) connected to the voltage step-up inductor (12) and an anode of a first diode (13). Two series output capacitors (14 and 15) are connected to a cathode of the first diode (13). An anode of a second diode (16) is connected to the capacitor (15) and a cathode of the second diode (16) is connected to the anode of the first diode (13). An output of the bridge rectifier (18) is connected to a primary coil of a current transformer (19). A transistor (17) is connected to the primary coil of the current transformer (19). In the present invention, the transistor (17) is used as an active switch.

Figure 2A:
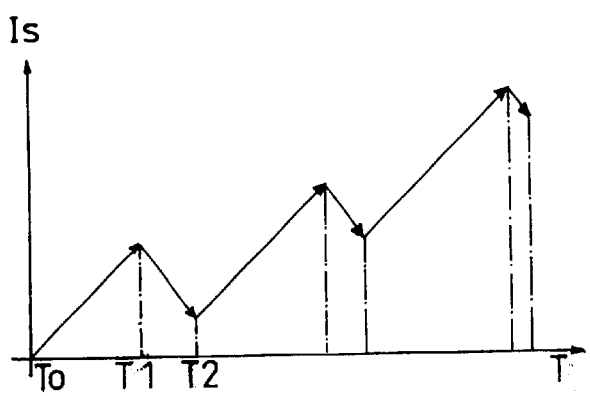
FIGS. 2A and 2B are output waveform views of a voltage step-up unit of the constant-frequency active filter in accordance with the present invention.

When the transistor (17) is activated, an input current ($I_S$) from the power supply (11) passes through the voltage step-up inductor (12) and hence the voltage step-up inductor (12) is charged. When the voltage step-up inductor (12) is charged, a waveform of the input current ($I_S$) is shown in FIG. 2A of a duration that starts at T0 and ends at T1.

When the transistor (17) is deactivated, the voltage step-up inductor (12) is discharged and the first diode (13) is activated, so that the input current passes through the first diode (13) to charge the capacitor (14). When the voltage step-up inductor (12) is discharged, the waveform of the input current ($I_S$), shown in FIG. 2A, has a duration that starts at T1 and ends at T2.

Figure 2B:
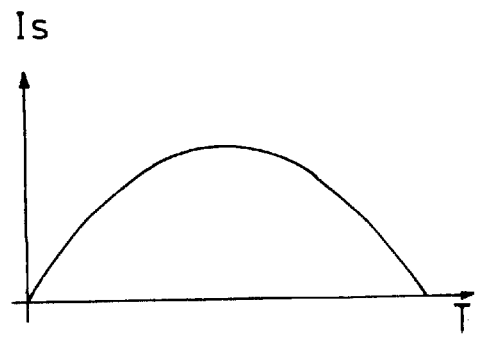

With reference to FIG. 2B, by inputting a clock signal from an output of the PWM controller (40) to control the transistor (17) to be selectively activated and deactivated, the voltage step-up inductor (12) is repeatedly charged and discharged, and hence a sine waveform input current ($I_S$) is obtained.

Still referring to FIG. 1, the voltage control unit (20) includes a microprocessor (21), a buffer (22) connected to the microprocessor (21), and a filter circuit connected to an output of the buffer (22), wherein the filter circuit is composed of R1, R2, C1, C2. An output of the filter circuit is connected to a compensation pin of the PWM controller (40) through two diodes D1 and D2.

Besides the PWM controller (40), the current control unit (30) further includes a photocoupler (31) connected to and controlled by an output pin of the PWM controller (40), wherein a base of the transistor (17) is connected to the photocoupler (31). An anode of a third diode (33) is connected to the current transformer (19) and a cathode of the third diode (33) is connected to a current sensing resistor (34). The cathode of the third diode (33) is connected to a C/S pin of the PWM controller (40) through a resistor R3. The detailed operation of the voltage control loop (20) and the current control loop (30) is expatiated below.

The microprocessor (21) receives the input voltage ($V_S$) from the power supply (11) and an output voltage ($V_{BUS}$) from the two output capacitors (14 and 15) for obtaining a current command ($I_C$). The microprocessor (21) outputs the current command ($I_C$) to the compensation pin of the PWM controller (40) through the buffer (22) and the filter circuit, wherein the phase of the current command ($I_C$) and input voltage ($V_S$) are the same. Furthermore, the buffer (22) is set to raise output ability of the current command ($I_C$) and the filter circuit is set to filter a noise of the current command ($I_C$). The detailed steps for obtaining the current command ($I_C$) are shown below:

setting up a reference voltage table and a default output voltage ($V_{BUS}'$);

detecting a phase of the input voltage ($V_S$) and the output voltage ($V_{BUS}$);

comparing the default output voltage ($V_{BUS}'$) and the output voltage ($V_{BUS}$) to obtain a difference value ($V_E$);

checking the phase of the input voltage ($V_S$) with the reference voltage table to obtain a reference voltage ($V_{REF}$); and multiplying the difference value ($V_E$) and the reference voltage ($V_{REF}$) to obtain the current command ($I_C$).

Figure 3:
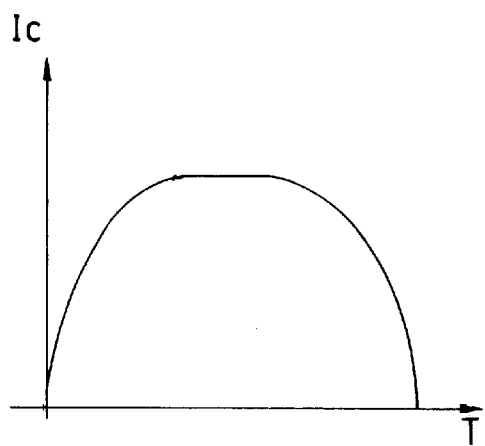
FIG. 3 is a waveform view of a current command ($I_C$) of the constant-frequency active filter in accordance with the present invention.

With reference to FIG. 3, the waveform of the current command $I_C$ is not a standard sine waveform and hence a total harmonic distortion of the constant-frequency active filter is decreased.

Figure 4:
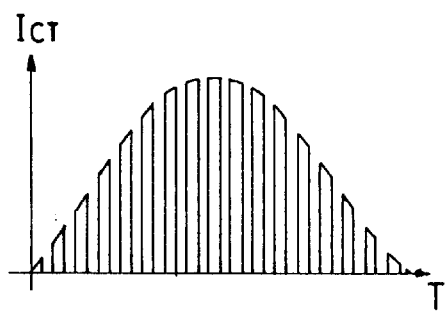
FIG. 4 is a waveform view of a sensing current ($I_{CT}$) of the constant-frequency active filter in accordance with the present invention.

The PWM controller (40) outputs the clock signal to control the transistor (17) to be selectively activated and deactivated via the photocoupler (31). When the transistor (17) is on, the input current $I_S$ passes through the bridge rectifier (18) and the primary coil of the current transformer (18). A sensing current ($I_{CT}$) is induced in a secondary coil of the current transformer (19) and passed through the third diode (33) into the C/S pin of the PWM controller (40). With reference to FIG. 4, a waveform of the sensing current ($I_{CT}$) is shown.

The PWM controller (40) receives and compares the sensing current ($I_{CT}$) and the current command ($I_C$). If the current command ($I_C$) is larger than the sensing current ($I_{CT}$), the PWM controller (40) outputs a high voltage level to make the transistor (17) to be on. If the current command ($I_C$) is smaller than the sensing current ($I_{CT}$), the PWM controller (40) outputs a low voltage level to make the transistor (17) to be off. By repeatedly controlling the transistor (17) to be selectively activated and deactivated, the input current ($I_S$) follows the sensing current ($I_{CT}$) and hence the phase of the input current ($I_S$) and the input voltage ($V_S$) becomes the same. Once the phase of the input current ($I_S$) and the input voltage ($V_S$) is the same, the power factor is raised.

Although the present invention has been explained in relation to its preferred embodiment, it is to be understood that many other possible modifications and variations can be made without departing from the spirit and scope of the invention as hereinafter claimed.

What is claimed is:

1. A constant-frequency active filter controlled by a peak current control mode, the constant-frequency active filter comprising:

a voltage step-up unit comprising a transistor used as an active switch to adjust a waveform of an input current to form a sine wave, wherein the voltage step-up unit comprises:
   a power supply arranged to provide an input voltage and the input current;
   a voltage step-up inductor connected to the power supply;
   a bridge rectifier connected to the voltage step-up inductor and to a first diode;
   a current transformer having a primary coil connected to the bridge rectifier and to the transistor;
   two series-connected capacitors connected to the first diode; and
   a second diode connected to the two series-connected capacitors and to the first diode;

a current control unit connected to the voltage step-up unit, wherein the current control unit comprises a PWM controller that outputs a clock signal to control a photocoupler connected to an output of the PWM controller so as to control the transistor connected to the photocoupler to be selectively activated and deactivated; and a voltage control unit connected to the current control unit, wherein the voltage control unit comprises a microprocessor for providing a current command to control the clock signal outputted by the PWM controller.

2. The constant-frequency active filter controlled by a peak current control mode as claimed in claim 1, wherein the voltage step-up unit comprises: a power supply for providing an input voltage and the input current;

a voltage step-up inductor connected to the power supply;

a bridge rectifier connected to the voltage step-up inductor and a first diode;

a current transformer having a primary coil connected to the bridge rectifier and the transistor;

two series capacitors connected the first diode; and a second diode connected to the two series capacitors and the first diode.

3. The constant-frequency active filter controlled by a peak current control mode as claimed in claim 1, wherein the voltage control unit further comprises:

a buffer connected to the microprocessor for enhancing an output ability of the current command; and a filter circuit connected to the buffer for filtering a noise signal of the current command, an output of lie filter circuit being connected to a compensation pin of the PWM controller.

4. The constant-frequency active filter controlled by a peak current control mode as claimed in claim 1, wherein the current transformer has a secondary coil connected to a third diode, the third diode being connected to a C/S pin of the PWM controller, whereby an induced sensing current is inputted to the C/S pin of the PWM controller.

* * * * *